United States Patent [19]

Frazier, Jr. et al.

[11] 4,124,850
[45] Nov. 7, 1978

[54] VIDEO PROCESSOR FOR DISTANCE MEASURING EQUIPMENT

[75] Inventors: Richard V. Frazier, Jr., Lauderdale Lakes; Tony Levenson, Tamarac, Fla.

[73] Assignee: The Bendix Corporation, Southfield, Mich.

[21] Appl. No.: 804,415

[22] Filed: Jun. 7, 1977

[51] Int. Cl.² .......................... G01S 9/02; G01S 9/56
[52] U.S. Cl. .................... 343/7.3; 343/5 DP; 343/6.5 LC
[58] Field of Search ............... 343/6.5 LC, 7.3, 5 DP

[56] References Cited

U.S. PATENT DOCUMENTS

| | | | |
|---|---|---|---|
| 3,412,400 | 11/1968 | Aker | 343/7.3 |
| 3,539,978 | 11/1970 | Stedtnitz | 343/7.3 |
| 3,641,572 | 2/1972 | Lundgreen et al. | 343/7.3 |
| 3,666,367 | 5/1972 | Farnsworth et al. | 343/7.3 |
| 3,680,097 | 7/1972 | Huntsinger | 343/7.3 |
| 3,792,471 | 2/1974 | Kingsbury | 343/7.3 |

*Primary Examiner*—S. C. Buczinski

*Attorney, Agent, or Firm*—Bruce L. Lamb; William G. Christoforo

[57] ABSTRACT

A video processor for Distance Measuring Equipment in which all timing functions including fixed delays are performed by digital counters counting clock pulses from a highly stable source. Search and track operations are conducted by starting a memory counter by a reply from a responser and stopping the memory counter at a time corresponding to maximum range. On a succeeding interrogation cycle the memory counter is started prior to the time a reply at zero range would be received. In this cycle the memory counter begins count with the count it contained when stopped during the previous cycle; the memory counter counts until it reaches a number corresponding to maximum range, stops and initiates a range gate. A reply within the range gate causes the range gate to be repeated at the same time in the following interrogation cycle. A sufficient number of replies within the range gate cause tracking operation to begin. A velocity memory provides continuing tracking during temporary loss of reply signals.

15 Claims, 8 Drawing Figures

VIDEO PROCESSOR FOR DISTANCE MEASURING EQUIPMENT

The present invention relates to Distance Measuring Equipment for use in aircraft navigation and more particularly to a video processor for such equipment.

Distance Measuring Equipment (DME) is now widely established as an en route navigational aid for aircraft. DME is intended to provide a continuous indication to an aircraft pilot of the slant range between his aircraft and a particular ground station. To implement this navigational aid, numerous ground stations or responsers have been built, or are planned to be built, at such locations that an aircraft flying the airways will seldom, if ever, be in a position where use cannot be made of the aid. The system is simple in principle. The DME aboard the aircraft transmits on a particular frequency an interrogation signal consisting of a pair of pulses having a particular spacing. The ground responser reacts to an interrogation signal by, after a fixed delay, transmitting on another particular frequency a pair of pulses with a particular spacing. The DME determines the distance to the responser by measuring the time elapsing between the initiation of an interrogating signal and reception of a reply from the responser. After allowance for the fixed delay inserted by the responser, this elapsed time is directly translatable to an indication of distance.

The DME includes several subsystems which are vital to its operation such as the r.f. transmitter, the modulator, the receiver, etc. However, most of the inventive effort connected with DME has been directed to the video processor thereof which has the functions of timing the interrogation signals, determining the validity of reply signals, determining the time lapse between interrogation and reply, conducting range search and range track for reply signals and providing memory for a limited time of previous distance determinations. The present invention is particularly directed to improvements in video processors for DME.

The earliest video processors for DME applied analog techniques for timing and were fairly direct descendants from automatic range gate circuits used in tracking radars. Search for valid replies in such processors required a comparatively long time since it involved slowly sweeping a range gate from zero distance to maximum range. If a reply was detected in the gate, track was initiated which brought into operation means for centering the reply within the range gate. If the reply proved to be false, search from zero distance began again.

Subsequent improvements employing digital techniques have substantially reduced the search time and improved the accuracy of DME video processors. Search times can now be as little as the time required for five to ten interrogation cycles, while errors in range measurement can be reduced to the distance represented by the period of the clock used to time the interval between transmission of an interrogation and receipt of a reply. However, the full potential of improvements in accuracy afforded by digital video processors has not been achieved in devices known prior to the present invention, since certain fixed delays in the equipment such as receiver delays and decoder delays have been ignored or only approximately accounted for by timing devices not synchronized with the system clock. Typically, such devices comprise delay lines and monostable multivibrators. In addition to improving accuracy, the elimination of such devices enables all critical circuits of the video processor to be constructed as a single integrated circuit providing the attendant advantages of reduced weight, bulk and power consumption, improved reliability and ease of fabrication of the equipment.

It is an object of the present invention to provide a video processor for DME having improved accuracy by permitting compensation for manufacturing tolerances, by providing for precise timing of interrogation and reply signals and by accounting for delays inherent in the equipment.

It is a further object of the invention to provide a video processor for DME capable of determining the rate of change of distance between the aircraft and the ground station and of providing distance readings which continue to change at the rate established by travel of the aircraft when replies from the responser are missing for a limited time.

It is another object of the invention to provide a video processor for DME in which the least significant digit of the distance indication does not jump back and forth as the distance between the aircraft and the responser changes.

Briefly, the video processor of the invention comprises digital counter means active at the initiation of an interrogation cycle for timing the interrogation pulses and a delay period compensating for delays encountered in the airborne transmitter, the ground responser, the airborne receiver and the signal decoder. At the end of the delay period, a reference pulse is generated which marks the time of appearance of a reply signal at zero range after its delay in the receiver and the decoder. The reference pulse also starts a range counter which counts for a period corresponding to the maximum range of the equipment and is used to stop a memory counter at that point. The memory counter, during search, is started by the delayed reply signal and is stopped in that interrogation cycle by the range counter. In the succeeding interrogation cycle the memory counter is started slightly in advance of the range counter with the count beginning at the same count at which it was stopped in the preceding interrogation cycle. When the memory counter reaches full count, which is the same count as the full count of the range counter, the memory counter stops and generates a range gate. At the center of the range gate a second reference pulse is generated. The time difference between the two reference pulses corresponds to the distance between the aircraft and the ground station. The second reference pulse also restarts the memory counter, during track, so that the range gate will be repeated at the same location in still the next interrogation cycle. Means are provided to cause the range gate to track the changing distance due to travel of the aircraft and means are provided to cause this tracking to continue at an established rate for a limited time if reply signals should be missing temporarily.

Figure 1:
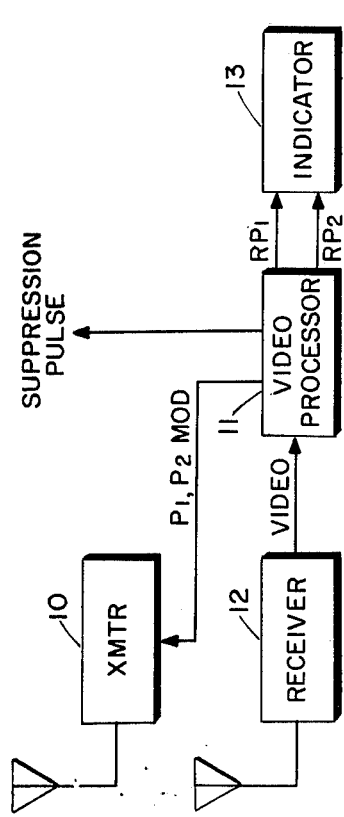
FIG. 1 is a simplified functional block diagram of an airborne Distance Measuring Equipment.

FIG. 1 is a simplified block diagram of the airborne unit of a DME system. The interrogation signal from the transmitter to the ground based responser (not shown) comprises pulse pairs, the spacing between pulses of which is either 12us or 36us according to whether the responser is operating on the "X" or "Y" channel. These pulses originate in the video processor 11 of the equipment and are supplied to the modulator of the transmitter 10. At the time of generation of the modulating pulses processor 11 also generates a suppression pulse to inhibit operation of other transponder equipment aboard the same aircraft. Upon receipt of the first pulse of an interrogation pair the responser begins timing a fixed delay period during which it determines whether a second pulse of the interrogation signal is present at the correct spacing. At the end of the fixed delay the responser transmits a pair of pulses with either 12us or 30us spacing, depending upon whether it is operating on a "X" or "Y" channel. (Note that the "Y" channel pulse spacings for air to ground and ground to air transmissions are different.) The responser pulse pairs are received and detected by the airborne receiver 12 and presented as video signals to the processor 11. Beginning with the generation of the first of the modulation pulses for the interrogation signal the processor starts to time a fixed period which includes the fixed delay time of the responser and additional times corresponding to transmitter delay, receiver delay, and decoder delay. At the end of this fixed delay the processor generates a reference pulse $RP_1$.

The video output of receiver 12 includes not only the reply pulse pair to the interrogator signal from transmitter 10, but also random pulse pairs and reply pulse pairs from the responser to any other aircraft which might be operating in the area. The processor decodes the video pulses to select only properly spaced pulse pairs. It then determines which of those pulse pairs occupy a fixed time relationship with respect to the interrogation signal in order to establish the coherency and hence, validity of reply of a particular pair of pulses amongst the many pulses present in the video signal. Having determined the validity of a reply, the processor generates a second reference pulse $RP_2$. The difference in time between the appearance of $RP_1$ and the appearance of $RP_2$ is directly proportional to the distance, actually the slant range, between the aircraft and the responser. Accordingly, $RP_1$ and $RP_2$ may be used to start and stop a digital clock in an indicator 13 which includes means for displaying the $RP_1$-$RP_2$ time difference, in terms of distance and which may include means for converting the time difference to an analog voltage or digital number for computational purposes.

The operation and construction of video processor 11 will now be described with reference to FIG. 2. An interrogation signal is triggered by the output of a PRF oscillator 20 which operates at a nominal frequency of 140 PPS, but which includes a noise source for jittering the oscillator period a small amount. Such PRF generators are commonly provided in DME to insure that the PRF will not be synchronous with the DME in another aircraft and cause false distance indications to appear. The 140 PPS output of oscillator 20 is utilized during search operations. A frequency divider 21 divides the frequency of oscillator 20 by 10 to provide 14 PPS output for use during track operation. Logic gate 22 selects a 14 PPS interrogation rate if a track signal (later to be described) is present. Since search must first be conducted, initially 140 PPS passes through gate 22 each of which enables gate 23. Gate 23 controls the application of clock pulses from a 1.61825 MHz clock oscillator 24 to a range counter (XMT) 25. The period of clock oscillator 24 is equal to the round trip radio propagation time over a distance of 0.05 nautical miles and hence, range counter 25 can be considered to count in increments of that distance. In terms of time, the clock period is approximately 0.6us.

Range counter 25 has a capacity of 4000 bits or 200 NM. When enabled counter 25 generates a suppression pulse which continues for 73 counts or approximately 45.1us. At count 5 modulating pulse $P_1$ of the interrogation signal is initiated. This pulse continues for one count. At count 24 or count 63, depending upon whether an "X" channel or a "Y" channel is being used, modulating pulse $P_2$ is initiated. An "X" channel pulse spacing of 11.9us or a "Y" channel pulse spacing of 35.9us is thereby provided. Modulating pulses $P_1$ and $P_2$ are applied to the transmitter 10 of FIG. 1 and the suppression pulse is applied to other transponding equipment aboard the aircraft. At count 138 or count 148, range counter 25 resets and through gate 26 enables a variable delay counter 27. The total delay between initiation of modulating pulse $P_1$ and initiation of count in variable delay counter 27 is either 82.5us or 88.5us, depending upon whether "X" or "Y" channel operations are being conducted.

Variable delay counter 27 has a capacity of from 2 to 14 counts depending upon the setting of an external control switch which selects the end of count. Provision of a selectable end of count for the variable delay counter permits compensation to be made for variations in the fixed delays of the receiver and transmitter resulting from production tolerances. This adjustment is made as a factory calibration and is not altered when the equipment is in use. At the end of the selected count delay counter 27 is reset and simultaneously through gate 28 an update counter 29 is enabled. Update counter 29 has a 10 count capacity. Its primary function, later to be described, is to provide means for adjusting the position of a range gate during track operation. When counter 29 has counted to 9 reference pulse $RP_1$ is produced. Counter 29 continues one more count to 10, stops and resets. $RP_1$ enables gate 31, starting range counter (RCV) 25' at zero count which comes to its full 4000 count (200 NM) capacity, then stops and resets. For purposes of simplifying the description at this point, range counter 25' has been shown as separate from range counter 25. However, by appropriate logic, range counter 25 can serve both the transmit and receive functions.

Following the transmission of an interrogation signal received video pulses through gate 34 enables a decode counter which opens a "window" about the expected second pulse spacing of 12us or 30us. This window enables a latch 36 so that if a second video pulse is present at the correct spacing, latch 36 will be set. Decode counter 35 continues counting beyond count 50 (30us) to count 62 (38.6us) whereupon it stops, resets, and generates a strobe for gate 38 which will produce a delayed reply output pulse provided latch 36 has been set. During search, the delayed reply pulse is applied through gates 41, 42 and 43, later to be more fully described, to start a memory counter 45.

Memory counter 45, like range counter 25', has a capacity of 4000 counts or 200 NM. When enabled through gate 43 counter 45 counts until either it has reached full count or range counter 25' has reached full count, whichever occurs first, whereupon counter 45 is stopped. If counter 45 is stopped by itself reaching full count it simultaneously resets. If counter 45 is stopped instead by counter 25' reaching full count, the count present in counter 45 at that time is retained by counter 45 for use during the next interrogation cycle. Upon reaching full count, memory counter 45 resets and through gate 46 enables range gate counter 47. Range gate counter 47 has a capacity of 15 counts. At count 7, hereinafter called "center of range gate" output pulse $RP_2$ is generated and through gates 41, 42 and 43 memory counter 45 is restarted. Between the counts of 1 and 15 range gate counter 47 opens a range gate in search-track logic 48 and select gate 41. The presence of a delayed reply within the range gate is registered in a three out of seven counter 52 and search-track logic 48 transmits the delayed reply to an early/late detector 51 which determines whether the delayed reply was received before or after the appearance of the center of range gate pulse.

Detector 51 includes logic which determines whether the delayed reply from gate 38 occurs between counts of 1 and 6 of range counter 47 and thus is early or whether the reply occurs between counts 8 and 14 of the range counter and is thus late. The detector includes an eleven bit shift register and a "to/from" flip-flop. If a reply is received early a "1" bit is entered 4 bits from the "0" end of the register. Each successive early reply will cause the register to decrement until the "1" appears at the "0" end of the register. If the reply was late, the register is incremented upwards from the "4" position towards the "11" position. The to/from flip-flop is set to "to" by the bit shifted from the "0" or early end of the register. Conversely, the flip-flop is set to "from" by a bit shifted from the "11" or late end of the register. Whether the bit shifted out of the register of detector 51 appears at the early end or late end of the register or not at all determines the action which will be taken by update selector logic 53 during the following interrogation cycle. If no bit appears from the register, update selector 53 starts, through gates 42 and 43, memory counter 45 upon count 2 of update counter 29 on the following interrogation cycle. If a bit appears at the early end of the register, update selector 53 starts memory counter 45 upon count 1 of update counter 29. If a bit appears from the late end of the register update selector 53 starts memory 45 upon count 3 of update counter 29. As will shortly be better understood with the aid of an example, early/late detector 51 and update selector 53 cause the center of the range gate to occur earlier in time and hence at shorter range or later in time, at longer range, as may be required to track the travel of the aircraft.

In addition to controlling update selector 53, bits shifted out of the register are supplied to velocity memory 54, later to be described, which determines the frequency at which the bits are issuing from the register. If the criterion of three valid replies to seven interrogations is not met, velocity memory 54 controls update selector 29 so that tracking can continue smoothly for approximately ten seconds, after which the system reverts to the search mode. The to/from flip-flop enables pulses from the velocity memory to be applied in the proper sense to maintain tracking during operation on velocity memory in the direction in which tracking was proceeding before failure of the three out of seven criterion.

The operation of the invention may be better understood by consideration of a specific example. Assume that the aircraft is located 55 miles from the ground responser and that the system is operating with "X" channel pulse spacing. Interrogation begins with a trigger pulse from PRF oscillator 20 which starts range counter (XMT) 25. At counts 5 and 24 range counter 25 initiates modulation pulses $P_1$ and $P_2$ and continues counting to count 138, thereby timing out a delay of 82.5us, whereupon range counter 25 stops, resets and count in variable delay counter 27 is initiated. Variable delay counter 27 counts a preselected amount, nominally 8 counts, stops and initiates count in update counter 29. Update counter 29 counts to 9 and produces reference pulse $RP_1$. A total delay between the leading edge of modulation pulse $P_1$ and the leading edge of reference pulse $RP_1$ of 94.5us, nominal, is thereby generated. This total provides compensation for transmitter delay, responser fixed delay, receiver delay and decoder delay.

Reference pulse $RP_1$ immediately starts range counter (RCV) 25' which proceeds to count until its full capacity of 4000 bits is reached. During this interval at a time corresponding to 55 miles distance a reply is received, decoded by counter 35 and strobed out of gate 38 after a delay of 38.6us from the leading edge of the first video reply pulse. This delayed reply through gates 41, 42 and 43 starts memory counter 45 which counts until it is stopped by the end of count of range counter 25' through gates 44 and 43. The first interrogation cycle has ended at which point memory counter 45 contains a count of 2900. The count in memory counter 45 is 2900 because it commenced count upon receipt of a reply (at 55 miles) and continued count until range counter 25' reached its end of count (4000, equivalent to 200 miles). Thus the count contained in memory counter 45 is equivalent to 200 − 55 = 145.

The second interrogation cycle is initiated by a trigger from PRF oscillator 20 which causes modulation pulses $P_1$, $P_2$ and reference pulse $RP_1$ to be generated as in the case of the first interrogation cycle. Again range counter 25' is started by reference pulse $RP_1$. However, in this cycle at count 2 of update counter 29 memory counter 45 is started (with count 2900) through gates 53, 42 and 43 and the memory counter counts until it reaches full capacity of 4000 bits. Thereupon memory counter 45 stops, resets and initiates count, through gate 46, in range gate counter 47. Since reference pulse $RP_1$ is generated at count 9 of update counter 29 memory counter 45 starts 7 counts earlier for this cycle than does range counter 25'. Therefore, range gate counter 47 begins counting 7 counts earlier than the expected appearance of a delayed reply pulse from gate 38 and counter 47 reaches the center of range gate (count 7) at the expected time of appearance of a delayed reply from gate 38. The center of range gate pulse from counter 47 appears as reference pulse RP$_2$. A delayed reply from gate 38 at this time restarts, through gates 41, 42 and 43, memory counter 45. Memory counter 45 then counts until range counter 25' reaches end of count, ending the second interrogation cycle. At this time memory counter 45 will again contain a count of 2900 and reference pulse RP$_2$ will have been generated at a time corresponding to 55 miles distance.

During the third, fourth and fifth interrogation cycles the delayed reply may have appeared early or late with respect to the center of range gate from counter 47. However, three valid replies in the range gate are required to actuate the track modde. During this time the range gate is held stationary by restarting memory counter 45 by the center of the range gate. Having achieved valid track and assuming that the reply was early, three successive early replies will cause a bit to appear from the early end of the register of early/late detector 51. The bit appearing from the early end of the detector register causes gate 53 to select count 1 of update counter 29 as the starting time for memory cyunter 45 on the succeeding interrogation cycle. By starting memory counter 45 one count earlier on the next interrogation cycle the center of range gate from counter 47 also appears one count earlier, the time difference between RP$_1$ and RP$_2$ will be reduced by one count and the count stored by memory counter 45 at the end of that cycle will be increased by one count to 2901. Thus on subsequent interrogation cycles when memory counter 45 is started at count 2 of update counter 29 it contains one count more than the initial interrogation cycles. It will consequently reach its end of count one count earlier than before and will cause the center of range gate to continue to appear one count earlier than before. By updating the memory counter 45 in this manner the time difference between reference pulses RP$_1$ and RP$_2$ is caused to track the travel of the aircraft toward or away from the responser.

The foregoing description of the operation of the invention has been simplified by assuming that replies were present at the same range to all interrogation signals. A further simplification in the foregoing explanation is the assumption that a valid reply to the second interrogation signal is present. If no reply is present to an interrogation signal and provided the criterion of three valid replies out of seven interrogations has not been met, memory counter 45 is started by the first delayed reply to appear from gate 38 after the range gate applied to search-track logic 48 by range gate counter 47 is closed. Such a reply would occur only at a longer range than the range expected for reply during the second interrogation cycle. If no reply is received at the expected range on the second interrogation and no reply at longer range is received during that cycle, the third interrogation cycle begins search at zero range just as in the case of the first interrogation cycle. Thus the search operation comprises detecting the first pulse pair with proper spacing received after an interrogation signal, setting the memory counter to the difference in range between the range of the first received pulse pair and the range limit of the equipment, thereby preparing for the generation of a range gate in the next interrogation cycle which brackets the range of the first received properly spaced pulse pair. If during the second interrogation cycle a properly spaced pulse pair appears at shorter range than the expected reply it is ignored. If no reply is received within the range gate, replies received at ranges greater than the first reply and at a time later than the closing of the range gate will determine the time at which the range gate will open during the succeeding interrogation cycle. On the other hand, if on the second interrogation a reply is received within the range gate, counter 52 is enabled to determine whether the three out of seven criterion is being met so that valid track operation can be conducted.

Figure 3:
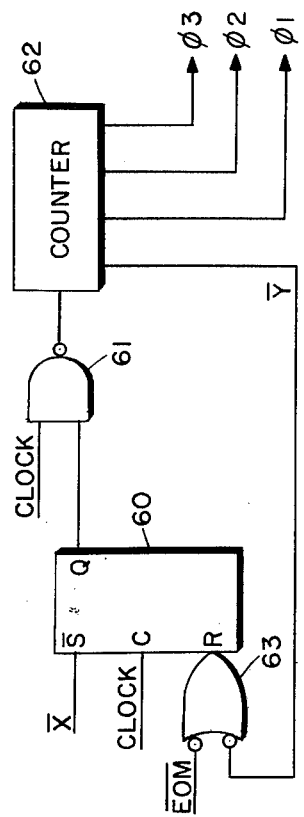
FIG. 3 is a functional block diagram showing logic means suitable for the control of various counters shown in FIG. 2.

The logic elements simplified in form in FIG. 2 will now be described in greater detail. Gates 26, 28, 34 and 46 are similar and may each be described with reference to FIG. 3 and the input-output table appearing below. An RS type flip-flop is set by input $\overline{X}$ to enable NAND gate 61. On the clock signal following the setting of flip-flop 60 counter 62, which may be either counter 27, 29, 35 or 47, begins to accumulate count producing, according to the function of counter 62, outputs $\phi_1$, $\phi_2$, or $\phi_3$. At the end of count of counter 62, input $\overline{Y}$ resets flip-flop 60 through NOR gate 63 stopping and resetting counter 62. The following table identifies the inputs and outputs of the circuit of FIG. 3 according to its function in FIG. 2.

| GATE (Fig.2) | X | Y | $\phi_1$ | $\phi_2$ | $\phi_3$ |
|---|---|---|---|---|---|
| 26 | End of Count Counter 25 | End of Count Counter 27 | End of Count Counter 27 | | |
| 28 | End of Count Counter 27 | End of Count Counter 29 | Count 9 Counter 29 | Counts 1, 2, 3 Counter 29 | End of Count (Count 10) Counter 29 |
| 46 | End of Count Counter 45 | End of Count Counter 47 | Range Gate (Counts 1-15) | Center of Range Gate (Count 7) Counter 47 | End of Count Counter 47 |
| 34 | Video | End of Count Counter 35 | End of Count Counter 35 (Strobe) | X or Y Pulse Window (Counts 16-24 or 46-54; Counter 35) | |

Fig. 3

Figure 2:
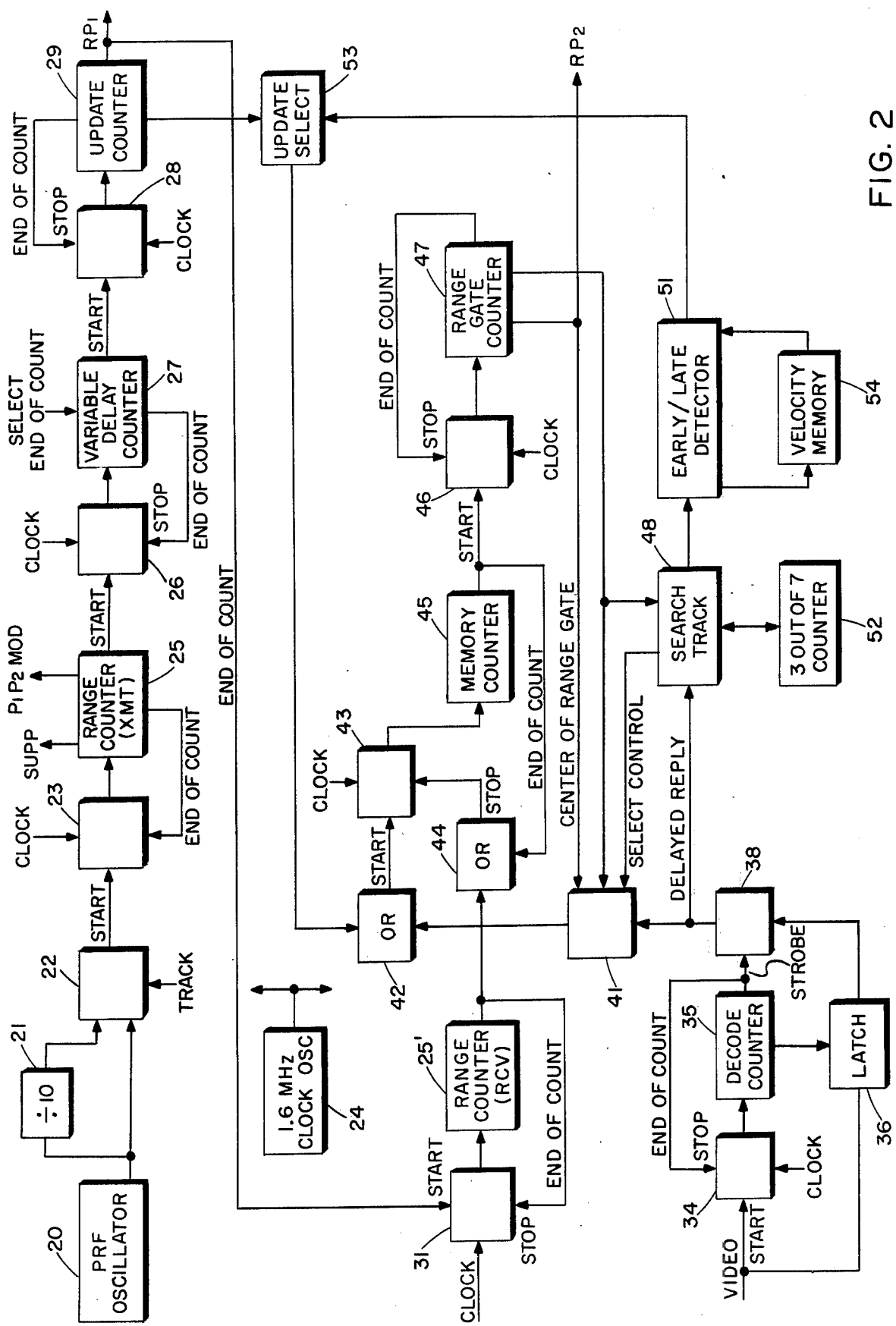
FIG. 2 is a functional block diagram of the DME video processor of the invention.

Various of the quantities identified in the above table are shown as complements to be consistent with the negative logic used in certain components of the actual embodiment of the processor of FIG. 2.

Figure 4:
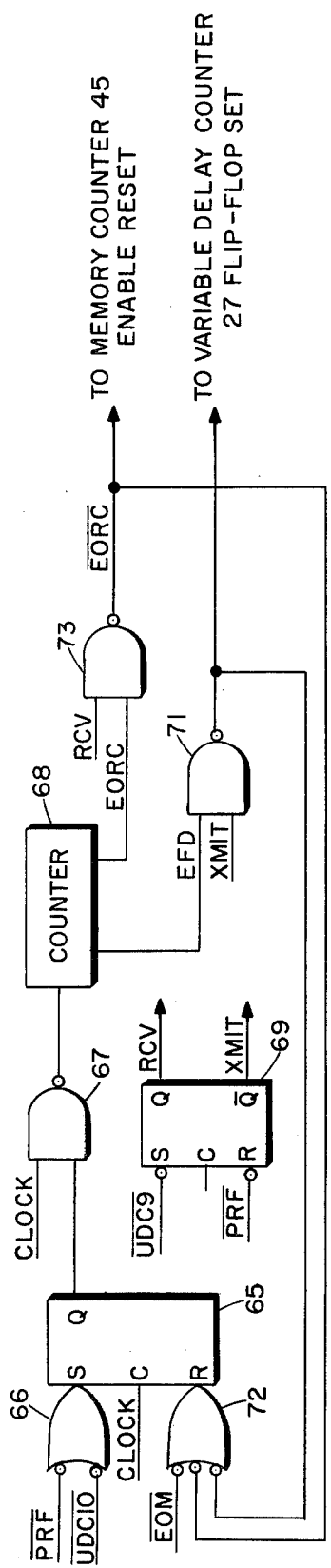
FIG. 4 is a functional block diagram showing logic means permitting a single counter to serve as the Range Counter (XMT) and as the Range Counter (RCV) shown in FIG. 2.

FIG. 4 illustrates logic performing the functions of gates 23 and 31 of FIG. 2 and which enables a single counter to perform the dual role as range counter (XMT) 25 and range counter (RCV) 25'. At the beginning of an interrogation cycle a pulse from PRF selector gate 22 sets an RS flip-flop 65 through NOR gate 66. This enables NAND gate 67 so that on the succeeding clock cycle count begins in counter 68. The same PRF pulse resets an RS flip-flop 69 causing the $\overline{Q}$ output thereof to go HI and enabling NAND gate 71. When counter 68 reaches the count required for the fixed delay by range counter 25 of FIG. 2 an output is transmitted by gate 71 to the logic described with reference to FIG. 3 enabling the variable delay counter 27 to begin count. Simultaneously the output of gate 71 resets flip-flop 65 through NOR gate 72 ending count in counter 68 and causing the same to reset. After the period of the variable delay from counter 27 has elapsed and after update counter 29 reaches the count of 9, flip-flop 69 is set causing the Q output thereof to go HI, thus enabling NAND gate 73 and disabling NAND gate 71. On the following clock cycle update counter 29 reaches the count of 10 again setting flip-flop 65 and enabling count in counter 68 to begin on still the next clock cycle. Counter 68 now functions as range counter (RCV) 25' and will count to its full capacity representing the maximum range of the equipment. When the end of count is reached in counter 68 an output is produced from gate 73 which stops memory counter 45, through logic shown in FIG. 5, and which resets flip-flop 65 in preparation for the next interrogation cycle.

Figure 5:
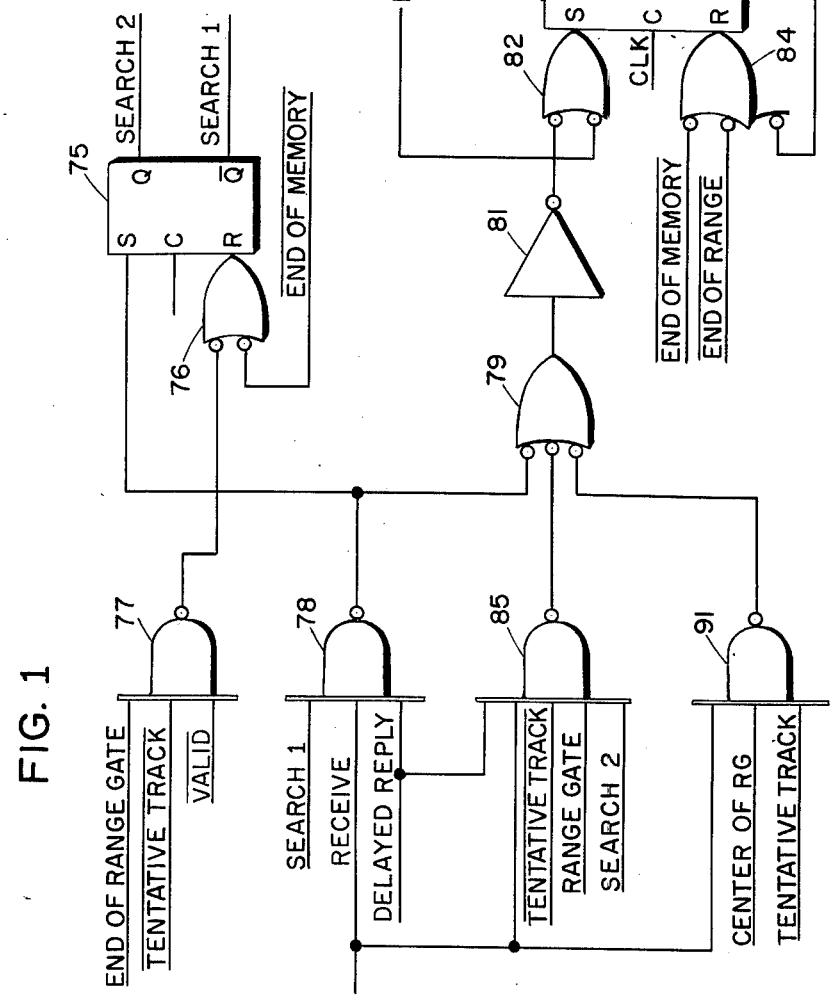
FIG. 5 is a functional block diagram showing logic means for starting and stopping count by the memory counter shown in FIG. 2.
Figure 6:
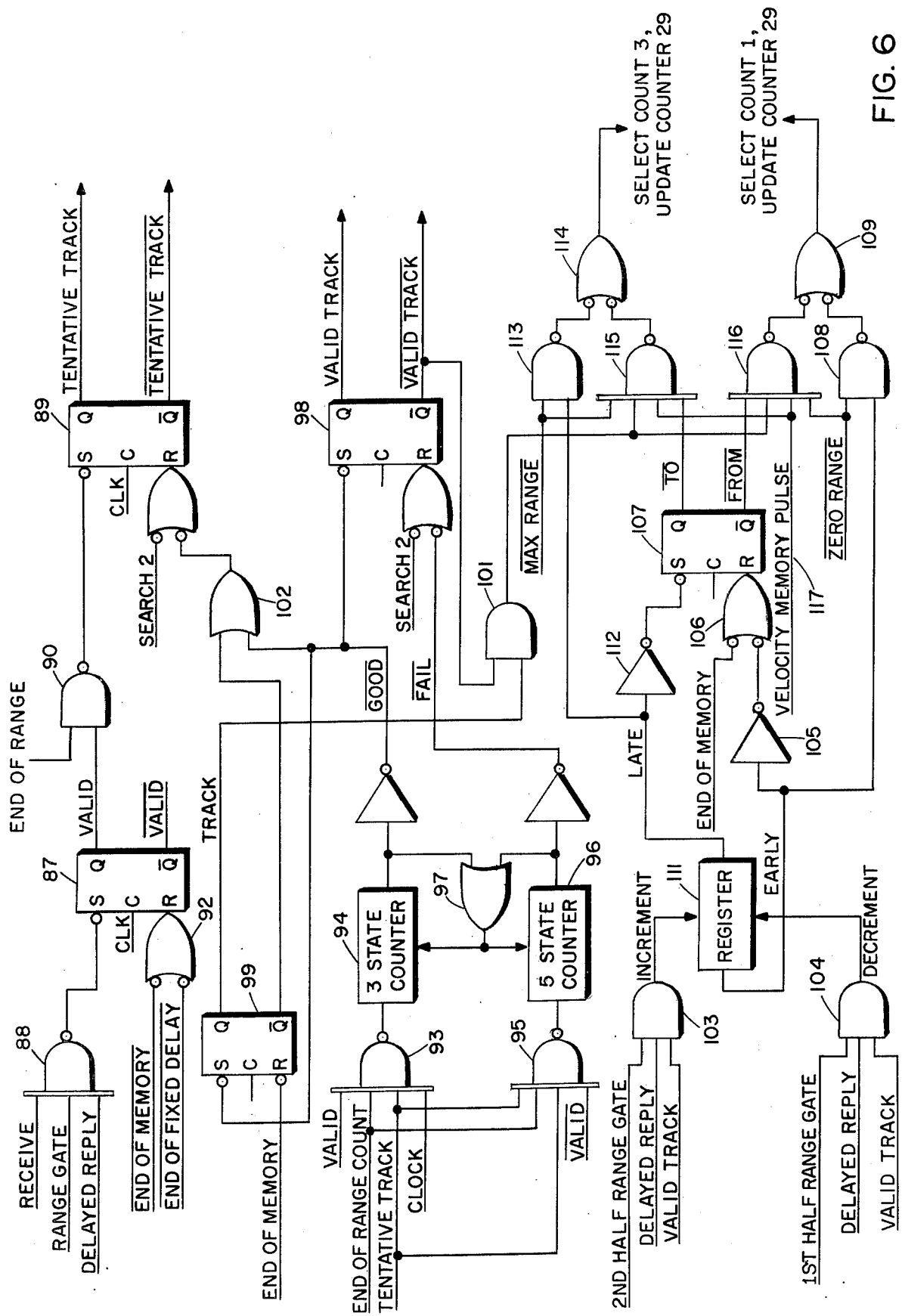
FIG. 6 is a functional block diagram showing details of the logic means used in the Search-Track and Early/Late Detector elements of FIG. 2.

FIGS. 5 and 6 show one means of implementing the logic of gates 41, 42, 43 and 44 of FIG. 2. Referring to FIG. 5, an RS flip-flop 75 is reset to "search 1" through NOR gate 76 either by "end of memory", later to be described, or by the output of NAND gate 77. Flip-flop 75 will be reset through gate 77 whenever the logic statement "end of range gate AND NOT tentative track AND NOT valid" is true. In the foregoing, end of range gate is a pulse generated at the conclusion of the range gate. Neither tentative track nor "valid" inputs to gate 77 are true during the first interrogation cycle, so that at the beginning of the receive phase of the first interrogation cycle flip-flop 75 will be reset to search 1, thereby partially enabling NAND gate 78. Gate 78 is further enabled by the output "receive" of flip-flop 69 (FIG. 4) so that the first delayed reply strobed out of gate 38 during the first search fully enables gate 78, setting flip-flop 75 to "search 2". At the same time output from gate 78 through nor gate 79, inverter 81 and NOR gate 82 sets an RS flip-flop 83, thereby enabling memory counter 45 to begin count on the next clock cycle. Recollect from the description of FIG. 2 that the memory counter 45 then counts until it is stopped by the end of count of range counter 25'. This stopping signal appears complemented as end of range and is applied through NOR gate 84 to reset flip-flop 83.

On the second interrogation cycle flip-flop 75 has been set to search 2 disabling gate 78 and partially enabling NAND gate 85. Gate 85 is also partially enabled by the "receive" output of flip-flop 69 and the tentative track input. During this interrogation cycle memory counter 45 is started with the count accumulated during the first interrogation cycle by a pulse from update counter 29 which occurs before range counter 25' begins count. When counter 45 reaches full count, flip-flop 83 is reset by the end of count signal from counter 45 applied through inverter 86 and gate 84. This same end of count starts range gate counter 47, providing the range gate "window" enablement to gate 85 and conditioning it for transmission of a delayed reply strobed out of gate 38. Memory counter 45 is restarted by flip-flop 83 at the clock cycle following the appearance of the delayed reply passed by gate 85.

Referring to FIG. 6, if during the second interrogation cycle a delayed reply is received within the range gate, the Q output of an RS flip-flop is set HI through NAND gate 88. At the end of that second interrogation cycle the Q output "tentative track" of an RS flip-flop 89 is set HI by NAND gate 90 which passes the end of range count signal (inverted) from gate 73 (FIG. 4) and the "valid" output of flip-flop 87. Flip-flop 89 will remain set to "tentative track" during succeeding interrogation cycles unless the criterion of three valid replies for seven interrogations is not met.

Again referring to FIG. 5, on the third interrogation cycle gates 77 and 85 are now disabled because the tentative track inputs thereto are now L0 and NAND gate 91 is enabled permitting the center of range gate signal from counter 47 (FIG. 2) to set flip-flop 83 and restart memory counter 45 on the following clock cycle.

Search track logic 48, early/late detector 51 and criterion counter 52 will now be described with reference once more to FIG. 6. If a reply within the range gate is received during the second interrogation cycle flip-flop 87 will be set to valid and at the end of that interrogation cycle flip-flop 89 will be set to tentative track. During the transmit phase of the third interrogation cycle flip-flop 87 will be reset by the end of count signal from range counter (XMT) 25 through NOR gate 92. When a delayed reply is received within the range gate on the third interrogation cycle flip-flop 87 through gate 88 will again be set to valid, thus qualifying all inputs to NAND gate 93 except "end of range count". At the end of the third interrogation cycle all inputs to gate 93 are qualified, thereby advancing a three-state counter 94 one count. If on the third or subsequent interrogation cycles a delayed reply is not within the range gate flip-flop 87 will not be set and its output will remain valid. At the end of such an interrogation cycle NAND gate 95 becomes enabled by the inputs valid, tentative track, and end of range count thereby advancing a five-state counter 96 one count. Three-state counter 94 resets itself upon reaching full count and simultaneously resets five-state counter 96 through OR gate 97. Counter 96 also resets itself and three-state counter 94 through OR gate 97 upon reaching full count. So long as three-state counter 94 reaches full count before five-state counter 96 the criterion of three good replies to seven interrogations is being met. The full count signal from counter 94 sets RS flip-flops 98 and 99 to "valid track" and "track", respectively. The track signal controls the interrogation rate through selector 22 of FIG. 2. If five-state counter 96 reaches full count before counter 94 flip-flop 98 resets to valid track. If the three out of seven criterion has been made good before it is failed the Q output of an RS flip-flop 99 will have been set HI, thereby enabling AND gate 101 whenever the criterion is failed, permitting tracking to continue from velocity memory as will shortly be described. If the three out of seven criterion has once been made good and is then failed, flip-flop 89 nevertheless remains set to tentative track until the expiration of the velocity memory period at which time flip-flop 99 is reset, enabling NAND gate 102 to reset flip-flop 89 to tentative track. Thereafter, flip-flop 75 (FIG. 5) resets to search 1 and the search operation, described above, begins once more.

Early/late detector 51 comprises an AND gate 103 to which is applied a "window" which persists during the second half count of range gate counter 47, "valid track" from flip-flop 98 and the delayed reply from gate 38. AND gate 104 receives a "window" during the first half count of range gate counter 47, "valid track" and the delayed reply from gate 38. If the delayed reply appears at gate 104 during the first half of the range gate it passes through the then enabled gate 104 to decrement 11-bit register 111. A delayed reply from gate 38 appearing during the second half of the range gate will pass through the then enabled gate 103 to increment register 111 one count.

Initially register 111 is preset to six so that five decrement pulses from gate 104 will cause a pulse to appear at the one or early end of the register. Similarly, initially five increment pulses from gate 103 will cause a pulse to appear at the eleven or late end of the register. A pulse appearing at the early end of the register causes the register to be reset to four. A pulse appearing at the late end of the register causes the register to be reset to seven. Thus a hysteresis effect is present in the register so that once a direction of tracking is established, the number of the same kind of pulses, i.e. increment or decrement, initially applied required to shift a bit from the register in the same direction is less than the number of opposite kind of pulses required to shift a bit from the register in the opposite direction. Such hysteresis is highly desirable to prevent random jumping back and forth of the distance display.

An early pulse from register 111 passes through NAND gate 108, which is enabled except at zero range, and through NOR gate 109 to select count one of update counter 29 (FIG. 2) for starting memory counter 45. The early pulse from register 111 also resets, through inverter 105 and NOR gate 106, RS flip-flop 107 to from. A late pulse is passed by NAND gate 113, which is enabled except at maximum range, and NOR gate 114 to select count three of update counter 29 as the starting point for memory counter 45. The late pulse also passes through inverter 112 to set flip-flop 107 to to.

If the three out of seven criterion should at any time be failed counter 96 will reset flip-flop 98 to valid track thus passing an enabling signal through gate 101 to NAND gates 115 and 116. Depending upon whether flip-flop 107 was set to to or reset to from before the criterion was failed, gate 115 or gate 116 will be selected to transmit pulses appearing on line 117 from the velocity memory oscillator to gate 114 or gate 109 for selecting the appropriate starting count of memory counter 45.

Figure 7A:
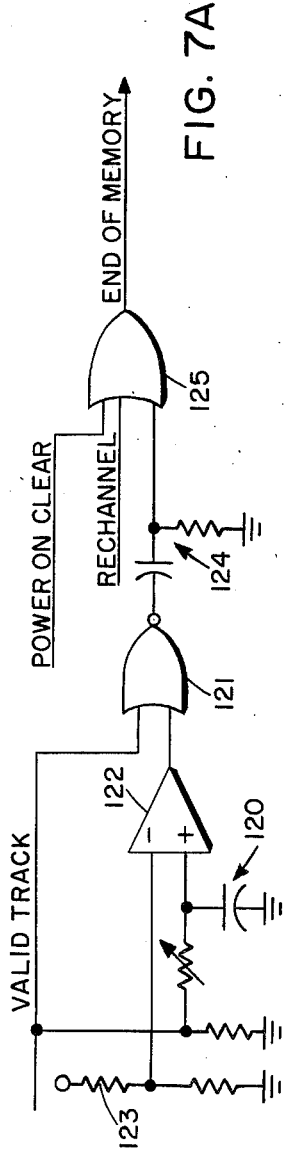
FIG. 7A is a functional block diagram of the velocity memory timer of the processor.

FIG. 7A shows the velocity memory timer. The valid track output of flip-flop 98 is applied to an RC integrating circuit 120 and to a NOR gate 121. Network 120 is connected to the non-inverting input of a voltage comparator 122. A fixed bias voltage from a voltage divider 123 is applied to the inverting input of comparator 122. The output of comparator 122 and the valid track signal are connected to a NOR gate 121. Network 120 is connected to the non-inverting input of a voltage comparator 122. A fixed bias voltage from a voltage divider 123 is applied to the inverting input of comparator 122. The output of comparator 122 and the valid track signal are connected to a NOR gate 121. NOR gate 121 is connected through a differentiating network 124 to an OR gate 125. Other inputs to gate 125 are power on clear and rechannel. The power on clear signal appears whenever power is first applied to the equipment and passes through gate 125 as an end of memory signal which clears the processor and sets it in the search 1 condition. The rechannel signal appears whenever the tuning of the interrogator is changed to a different channel and similarly passes through gate 125 as an end of memory signal. When a reply is acquired and the three out of seven criterion is being met the valid track output of flip-flop 98 is HI. When the valid track line becomes HI the capacitor of network 120 begins to charge to that level at a rate dependent upon the time constant of the network. During that charging interval the voltage across the capacitor of network 120 will equal and exceed the bias voltage of divider 123, switching the output of comparator 122 HI. The voltage across the capacitor of network 120 also depends upon the length of time that the valid track line remains HI. When the valid track line first goes HI the output of comparator 122 will be L0 and the output of gate 121 will be L0. When the capacitor of network 120 has charged to a level causing the output of comparator 122 to switch HI, the output of gate 121 remains L0. If the three out of seven criterion is now failed the valid track line becomes L0 and the capacitor of network 120 begins to discharge eventually reaching a level below the voltage of divider 123 and causing the output of comparator 122 to switch L0. With both inputs to gate 121 now L0 the output thereof switches HI and this transition will be differentiated by network 124 and passed by gate 125 as an end of memory pulse which clears the processor and sets it to a search 1 condition. The time constant of network 120 and the value of the bias voltage from divider 123 are selected to provide a nominal delay of 10 seconds between the disappearance of valid track signal and the appearance of the end of memory pulse from gate 125. However, the delay will be shorter than 10 seconds if the valid track signal has not been present continuously for at least that length of time.

Figure 7B:
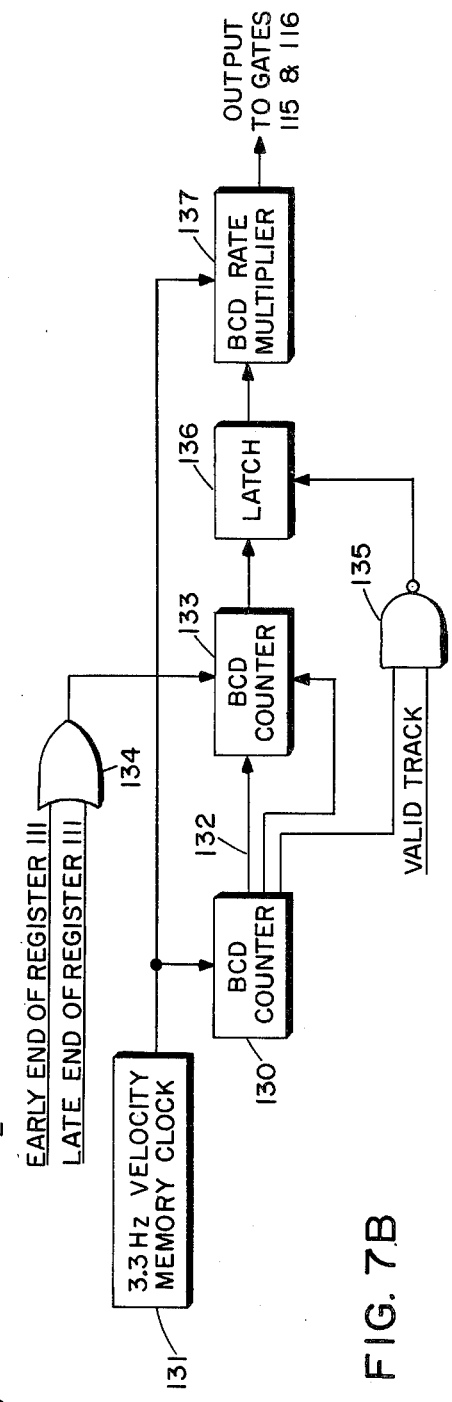
FIG. 7B is a functional block diagram of the velocity memory oscillator of the processor.

The velocity memory oscillator is shown in FIG. 7B. The velocity memory oscillator supplies pulses to permit tracking to continue between the time the three out of seven criterion is failed and before end of memory. To establish the frequency of the velocity memory pulses, the number of early or late pulses from the register 111 is counted during a 2.4 second interval. This number is stored and if the three of seven criterion should be failed the velocity memory oscillator generates in a 3 second period a number of pulses equal to the stored number. Since the read-in interval is 80% of the read-out interval the pulse frequency of the velocity memory is 80% of the frequency of the early/late pulses obtaining during valid track. Supplying memory pulses at a fractional rate of the actual tracking pulses prevents the distance display from backing up when valid reply signals again are received.

A first binary coded decimal counter 130 receives clock pulses from a 3.3 Hz oscillator 131. During clock pulses 0-7 counter 130 supplies on line 132 an enabling signal to a second binary coded decimal counter 133. While enabled counter 133 counts the early or late pulses from register 111 (FIG. 6). These early/late pulses are combined in an OR gate 134 for application to counter 133. On count 8 of counter 130 a clock signal is supplied through NAND gate 135, provided valid track signal is present, to a latch circuit 136 which stores the count accumulated by counter 133. On count 9 of counter 130 counter 133 is reset. A binary coded decimal rate multiplier 137 clocked by oscillator 131 produces at its output during a period of ten clock pulses a number of pulses equal to the number stored in latch 136. Thus if four early/late pulses were counted by counter 133 during the 2.4 second period it is active the input frequency would be 1.66 pps. Rate multiplier 137 would then produce four output pulses for ten clock pulses, a period of 3.0 seconds, resulting in a frequency of 1.33 pps. The ratio of the frequencies of velocity memory output pulses to early/late input pulses is therefore 0.8. Counters 130, 133, latch 136, and rate multiplier 137 are standard commercial circuits available from the Motorola Corporation as their IC type numbers MC 14527, MC 14042 and MC 14518.

The invention claimed is:

1. In a video processor for Distance Measuring Equipment, said Distance Measuring Equipment including means for transmitting interrogation signals to a responser station and means for receiving reply signals from said responser station, means for positioning a range gate to enable distance tracking of said reply signals comprising, a source of clock pulses, a memory counter for counting said clock pulses, said memory counter having a count capacity equal to the number of clock pulses which would occur during the time required for a signal to travel round trip between a Distance Measuring Equipment and a responser at maximum range of the Equipment, means actuated by a reply from the responser for starting count by said memory counter during a first interrogation-reply cycle of the Equipment;

means for stopping count by said memory counter during said first interrogation-reply cycle at a time when a reply would have been received at maximum range between the Equipment and the responser;

means for restarting count by said memory counter during a second interrogation-reply cycle of the Equipment, said restarting means being actuated at a time prior to the time a reply would be received by the Equipment if located at zero range between the Equipment and the responser;

means for stopping and resetting said memory counter upon said memory counter's reaching its full count capacity;

means actuated by said memory counter's reaching full count for generating a fixed time period constituting a range gate; and means for starting count by said memory counter a second time during said second interrogation-reply cycle whenever the reply is within said range gate.

2. A device as claimed in claim 1, with additionally, means for determining whether the reply of an interrogation-reply cycle subsequent to said first interrogation-reply cycle occurs early or late in said range gate, and means for adjusting said restarting means to cause restart of said memory during an interrogation-reply cycle subsequent to said first interrogation-reply cycle at a time earlier or later than restart occurred during said second interrogation-reply cycle according to whether said reply was determined to be early or late.

3. A device as claimed in claim 1 wherein said last-named means further provides for starting said memory counter a second time during said second interrogation-reply cycle whenever the reply is not within said range gate but occurs after the expiration of said range gate.

4. A device as claimed in claim 1 wherein said means for stopping count by said memory counter at a time when a reply would have been received at maximum range includes a range counter for counting said clock pulses, said range counter having a count capacity equal to the count capacity of said memory counter;

means for starting count by said range counter at the time a reply would be received by the Equipment if located at zero range between the Equipment and the responser; and means for stopping count by said memory counter whenever said range counter reaches its full count capacity.

5. A device as claimed in claim 1 wherein said means for generating a fixed time delay constituting a range gate comprises a range gate counter for counting said clock pulses, said range gate counter having a fixed count capacity and beginning count at zero when actuated by full count of said memory counter and continuing count until the full capacity of said range gate counter is reached, said fixed time period constituting said range gate being the time interval during which said range gate counter continues count.

6. A device as claimed in claim 5 wherein said means for restarting count by said memory counter includes:

means providing a first shift pulse whenever a reply occurs during count by said range counter through numbers less than the midvalue of the count capacity of said range counter;

means providing a second shift pulse whenever a reply occurs during count by said range counter through numbers greater than the midvalue of the count capacity of said range counter; and a shift register having a digital bit preset therein and shifting said bit toward one output terminal thereof by said first shift pulse and shifting said bit toward another output terminal by said second shift pulse, said bit when shifted to said one or another output terminal determining the time of restarting count by said memory counter in an interrogation reply cycle succeeding said second interrogation-reply cycle.

7. A device as claimed in claim 6 wherein said bit is preset in said register so as to require a different number of said first shift pulses to shift said bit to said one output terminal than the number of said second shift pulses required to shift said bit to said another output terminal.

8. A device as claimed in claim 6 with additionally means for determining the frequency at which bits are shifted from said register and for providing output pulses at a frequency proportional to said determined frequency, and means operable during temporary loss of reply signals for supplying output pulses from said frequency determining means to said restarting means in substitution for output pulses from said shift register.

9. A video processor for use in Distance Measuring Equipment to determine the time elapsing between initiation of an interrogation signal and the receipt and decoding of a reply signal, comprising, a source of clock pulses;

a first digital counter for accumulating said clock pulses and for generating at predetermined counts thereof:

(a) an interrogation pulse pair signal;

(b) a suppression pulse signal; and (c) a first end of count signal;

a second digital counter enabled by said first end of count signal for accumulating a predetermined adjustable count of clock pulses and providing a second end of count signal;

a third digital counter enabled by said second end of count signal for accumulating a predetermined count of said clock signals and providing (a) a relatively low selectable-count signal, and
(b) a relatively high fixed-count signal; said relatively high fixed-count signal constituting a first reference pulse;
a fourth digital counter enabled by said first reference pulse for accumulating a count of said clock pulses corresponding to the maximum range at which the Distance Measuring Equipment is to be operated and providing a third end of count signal upon reaching said count corresponding to maximum range;
means including a fifth digital counter for determining the spacing between pulse signals received by the Distance Measuring Equipment to establish reception of a pair of pulse signals having a predetermined spacing and for generating a delayed reply signal after a pair of pulses of said predetermined spacing has been received and after said fifth digital counter has counted a fixed number of said clock pulses beginning such count with the reception of the first pulse of said pair of predetermined spacing;
distance tracking means including sixth and seventh digital counters, said sixth counter constituting a memory counter, said seventh counter constituting a range gate counter,
during a first interrogation cycle consisting of the transmission and reception by the Distance Measuring Equipment of an interrogation pulse pair and a reply pulse pair, said memory counter beginning count of said clock pulses upon the appearance of said delayed reply signal and ending count upon the appearance of said third end of count signal,
during a succeeding interrogation cycle said memory counter beginning count upon the appearance of said selectable count signal from said third counter and providing a fourth end of count signal upon reaching a count equal to the maximum range count of said fourth counter,
said range gate counter beginning count of said clock pulses upon the appearance of said fourth end of count signal and providing a range gate center signal constituting a second reference pulse upon reaching a count intermediate of the counting capacity of said range gate counter, and
means for restarting the count of said clock pulses by said memory counter during that same succeeding interrogation cycle either
(a) upon the appearance of said range gate center signal, or
(b) upon the appearance the first said delayed reply signal to occur after said range gate counter reaches its full count capacity.

10. A video processor as claimed in claim 9 wherein said last named means includes, means for determining whether said delayed reply signal occurs during the interval when said range gate counter is actively counting.

11. A video processor as claimed in claim 9 with additionally
means providing an early signal whenever said delayed reply signal appears during the interval when said range gate counter is actively counting and before said range gate center signal is produced,
means providing a late signal whenever said delayed reply signal appears during the interval when said range gate counter is actively counting and after said range gate center signal is produced, and
means controlled by said early signals and said late signals for selecting the count of said third digital counter means at which said memory counter is started.

12. A video processor as claimed in claim 11 wherein said last named means includes a digital shift register having a digital bit preset therein, said early signal and said late signal respectively shifting said bit toward one and toward another output terminal of said register, the appearance of said bit at said one or said another output terminal of said register determining said count selected from said third digital counter means.

13. A video processor as claimed in claim 12 with additionally
means for determining the frequency at which bits appear at said one or another terminal of said register and for providing a memory signal having a frequency proportional to said determined frequency, and
means utilizing said memory signal for determining said count selected from said third digital counter during temporary loss of reply signals.

14. A video processor as claimed in claim 13 wherein said last named means includes
an eighth digital counter for counting as an event the appearance of said delayed reply signal during the interval when said range gate counter is actively counting, and
a ninth digital counter for counting as an event the absence of said delayed reply signal during the interval when said range gate counter is actively counting,
said ninth counter having a greater count capacity than said eighth counter, both said eighth and ninth counters being reset upon either said eighth or ninth counter reaching full count, said full count of said ninth counter causing said memory signal to be utilized for determining said count selected from said third digital counter.

15. A video processor as claimed in claim 14, with additionally
means responsive to the length of time in which full counts by said eighth counter occur for limiting the length of time during which said memory signal is utilized for determining said count selected from said third digital counter.

* * * * *